3,702,126
FRICTION PAIR FOR USE IN AIRCRAFT BRAKES
Phillip R. Eklund, 991 Stanwick Drive 45430, and Joseph E. Krysiak, 510 Wilmington Ave. 45420, both of Dayton, Ohio
No Drawing. Filed Dec. 23, 1970, Ser. No. 101,199
Int. Cl. F16d 69/02
U.S. Cl. 188—251 M
4 Claims

ABSTRACT OF THE DISCLOSURE

Rotor discs of aircraft disc brakes are constructed of alloyed steel having a nominal hardness of at least about 64 Rockwell C and brake pucks are constructed of either high purity aluminum oxide or stabilized zirconium oxide. The friction pairs thus produced exhibit a coefficient of friction which varies less than 0.1 over the temperature range of from 400° F. to 1000° F. The materials used also exhibit great resistance to wear. Thus, this invention is useful in that it provides improved friction pairs for use in aircraft disc brakes.

BACKGROUND OF THE INVENTION

(1) Field of the invention

This invention relates to friction pairs for use in disc brakes. More particularly, this invention relates to materials for use in rotor discs and brake pucks in disc brakes.

(2) Description of the prior art

The use of disc brakes in aircraft is well known. In aircraft disc brakes, a plurality of rotor discs and a plurality of brake pucks are mechanically forced together, usually by hydraulic means, to create friction and the friction resistance thus created stops the aircraft. The brake pucks are attached to a plurality of stationary, non-rotating discs called stator discs.

The rotor discs of aircraft disc brakes are usually constructed of uncoated, low carbon steel. The most widely used prior art steel is commonly known as 1035 brake rotor steel. AISI–SAE 1035 steel typically contains about 0.32 to 0.38 percent carbon, 0.60 to 0.90 percent manganese, a maximum of 0.040 percent phosphorous, and a maximum of 0.050 percent sulfur, with the balance being iron. Low carbon steel is used primarily because, when rotor discs and brake pucks are forced together in braking operations they are quickly heated to very high temperatures of 1000° F., or more, and the high temperatures cause a reaction between iron and carbon which produces a compound called martensite. The martensite produced by friction heating is very brittle and when it is formed on the surface of a rotor disc it is easily flaked off in subsequent braking operations. Thus, in actuality, low carbon steel is used to prevent excess wear.

Brake pucks which are attached to the surfaces of stator discs in positions where they will be brought into contact with rotor discs in braking operations, are commonly fabricated from organic materials. They usually contain, in addition to the basic organic material, particles of various inorganic materials such as bronze. The inorganic particles are used primarily as heat sinks to prevent rapid decomposition of the puck material under the high temperature conditions normally encountered in braking operations. Also, the inorganic filler material acts as a mechanical reinforcing agent to stiffen the structure.

Brake pucks may be attached to stator discs in a variety of ways. In small airplanes they are usually attached by adhesive bonding. In larger airplanes, at least one countersunk hole is usually drilled in each brake puck and the puck is riveted or bolted to the stator disc. Brake pucks may also be spring clipped to stator discs in a variety of ways. Finally, in some cases, inorganic material is used as a coating on stator discs to produce friction. In these cases, the inorganic material may be attached to the stator disc by sintering, brazing, or a variety of other methods.

It is well known that when two materials, at least one of which is in motion, are pressed together measurable friction or resistance to motion occurs. The amount of friction depends upon many factors. However, each friction pair (pair of materials being pressed together) has a characteristic coefficent of friction. The coefficient of friction for any given pair of materials is usually thought of as being independent of temperature. For example, Rabinowicz on page 93 of a book entitled Friction and Wear of Materials, 1965, John Wiley and Sons, Inc., states that, "Although . . . individual tests show considerable change in friction as the temperature is raised, the mean of all the tests shows essentially no variation." However, in actuality friction and the coefficient of friction are not independent of temperature.

Actually, when two materials are rubbed together over a wide range of temperatures, the coefficient of friction usually varies significantly. For example, when boron carbide and stainless steel are paired in air at temperatures between 0° F. and 2000° F., the coefficient of friction is about 0.5 near the low temperature, rises gradually until it reaches about 1.4 at about 1200° F., peaks sharply to about 2.5 at about 1250° F., drops sharply to about 0.2 at 1500° F., and then levels off (see page 94 of the Rabinowcz book). This is not an atypical curve. In fact, almost every friction pair tested to date exhibits similar sharp rises and drops in friction coefficient over a range of temperatures. Thus, even though the mean coefficient of friction may be relatively constant over a wide range of temperature, the coefficient of friction usually undergoes sharp rises and drops in value over the temperature range.

When aircraft disc brakes are operated, the material of the rotor discs and brake pucks is quickly heated from ambient temperature at the beginning of the landing to about 1000° F. or more as the brakes are applied. If, during this heating process, there is a large upward fluctuation in the coefficient of friction, brake grabbing will occur. If, on the other hand, there is a large downward fluctuation in the coefficient of friction, brake slippage will occur. Thus, it would be advantageous to fabricate friction pairs for aircraft brakes out of materials which exhibited an absolutely constant coefficient of friction at temperatures between ambient temperature and about 1000° F. Since such pairs of materials probably do not exist, it would be advantageous to fabricate friction pairs from materials which exhibit only very small fluctuations in friction coefficient over the range of temperatures specified. Finally, since the material of the friction pairs becomes very quickly heated in braking operations and spends most of its time at temperatures between about 400° F. and about 1000° F., it would be especially advantageous if the coefficient of friction were relatively stable at temperatures in that range.

In all probability, there are many pairs of materials which exhibit a relatively constant coefficient of friction at temperatures between about 400° F. and 1000° F. (The term relatively constant may be taken here to mean fluctuating less than about 0.1.) However, in selecting materials from which to fabricate rotor discs and brake pucks, there is a second property which must be given serious consideration. That property may be called wearability. A constant coefficient of friction is of no avail if the materials quickly erode and wear away.

At the present time, U.S. Air Force fighter planes are generally limited to 25 stops before the brake pucks must be replaced and the rotor discs examined for wear.

Bombers are limited to 50 stops. Cargo planes are limited to 100 stops. The variation in the number of stops allowed stems from the fact that fighters touch down at much higher speeds than bombers and bombers touch down at much higher speeds than cargo planes. It is, however, apparent from the limited number of stops allowed, that presently used brake materials leave something to be desired as far as wearability is concerned.

SUMMARY OF THE INVENTION

A friction pair, for use in aircraft brakes, which exhibits a fluctuation of less than 0.1 in coefficient of friction over a range in temperature of from about 400° F. to about 1000° F. and which exhibits excellent wear characteristics has now been found. The brake puck material of the friction pair is selected from high purity aluminum oxide and stabilized zirconium oxide. The rotor disc material of the friction pair is a steel sold under the trade name Lesco BG42 Vac Arc. For use in aircraft Lesco BG42 Vac Arc steel, hereinafter referred to as hardness of at least 64 Rockwell C. The steel may also be nitrided to provide even greater wearability.

DESCRIPTION OF THE PREFERRED EMBODIMENT

Lesco BG42 Vac Arc steel, which is used to fabricate rotor discs according to this invention, is manufactured by the Latrobe Steel Company of Latrobe, Pa. As manufactured, it has a hardness of about 15 to about 20 Rockwell C. For use in aircraft brakes it is hardened, by a process later described, to a hardness of about 64 Rockwell C.

Lesco BG42 Vac Arc steel, hereinafter referred to as BG42, has in its chemical makeup about 1.1 to about 1.2 weight percent carbon, about 14.0 to about 15.0 weight percent chromium, about 1.1 to about 1.3 weight percent vanadium, about 3.75 to about 4.25 weight percent molybdenum, a maximum of .025 weight percent phosphorus, a maximum of .015 weight percent sulfur, about 0.20 to 0.40 weight percent silicon, about 0.40 to 0.50 weight percent manganese, a maximum of 0.40 weight percent nickel, and a balance of iron. It has a greater percentage of carbon than do steels ordinarily used in fabricating rotor discs. However, it has been found that when the steel is hardened by the later described process and then subjected to friction heating followed by air cooling brittle martensite does not form on its surface. Thus, it exhibits excellent wearability.

BG42 may be hardened to a hardness of at least 64 Rockwell C by utilizing the following process:

(1) Preheat a sample of unhardened, as manufactured steel to a temperature of from about 1450° F. to about 1550° F. in an air furnace, in a neutral atmosphere, or salt bath.

(2) Austenitize the preheated sample by heating at about 2100±25° F. for about 3 to about 5 minutes in a neutral salt bath.

(3) Oil quench the austenitized sample to approximately room temperature.

(4) Stress relieve the sample at a temperature of from about 275° F. to about 300° F. for 1 to 1.5 hours and then allow it to cool naturally to a temperature at which it can comfortably be touched by human hands (approximately room temperature).

(5) After the sample has cooled to approximately room temperature, immediately cold treat it at −120° F. or lower [down to liquid nitrogen temperature (−320° F.)] for from about 1 to about 2 hours.

(6) After cold treating, allow the sample to warm to room temperature and then temper at 1000°±10° F. for 2 hours ±10 minutes.

(7) After tempering, allow the sample to cool naturally to room temperature.

(8) Finally, temper again at 1000°±10° F. for 2 hours ±10 minutes and, again, allow the sample to cool.

After treatment according to the above described process, BG42 steel will have a hardness of at least 64 Rockwell C. It is then ready to be finished machined into a rotor disc for use in aircraft brakes.

BG42 steel, hardened according to the above process, may be finished machined by normal techniques into rotor discs. It may also be nitrided in order to impart even more hardness. If one desires to nitride hardened BG42 rotor discs, one may do so by carrying out the following process:

(1) Grind a hardened BG42 rotor disc to dimensions approximately 2 mils smaller than those desired for the final disc.

(2) Place the thus ground disc in a 20 percent dissociated $NH_3$ atmosphere for 10 hours ±10 minutes at a temperature of 975°±5° F.

(3) Then change the atmosphere to 75 percent dissociated $NH_3$ and continue the treatment for 30 hours ±30 minutes at a temperature of 1020±5° F.

This latter process will yield a rotor disc with a case, approximately 6 mils in thickness, having a hardness of from about 73 to about 75 Rockwell C on an underlying substructure having a hardness of at least 64 Rockwell C.

Either hardened or hardened and nitrided BG42 rotor discs give excellent results when utilized as rotor disc materials with the brake puck materials of this invention.

The brake puck materials of this invention include high purity alumina, such as lucalox, and stabilized zirconia. Zirconia should be stabilized, in its cubic form, because unstabilized zirconia has a monoclinic structure which is relatively unstable. For example, unstabilized zirconia undergoes a monoclinic to tetragonal phase transformation at approximately 1850° F. If unstabilized zirconia were utilized as a brake puck material and if a rejected takeoff (one in which the aircraft must be stopped prior to taking off after reaching a speed just below takeoff speed) should occur, the brake puck material might reach a temperature of 1850° F. Should such a temperature be reached, the phase transformation might cause the brake puck to disintegrate with disastrous results.

Zirconia may be stabilized as a cubic structure in which it does not undergo the aforementioned destructive phase transformation. Stabilization may be accomplished by adding small amounts of various rare earth and rare earth like oxides to zirconia. For example, a brake puck may be fabricated by mixing 6 mole percent of an oxide selected from the group consisting of yttrium oxide, dysprosium oxide, and ytterbium oxide with 94 mole percent of zirconia, calcining at 800° C. for from 1 to 4 hours, grinding the calcined product into a powder, cold pressing the powder at from 50,000 p.s.i. to 200,000 p.s.i. to form a compacted material having the shape of a brake puck, and sintering the compacted material at about 1450° C. for about 16 hours. This is just one method by which zirconia may be stabilized and formed into brake pucks. Techniques for stabilizing and handling zirconia from a well developed art in themselves and do not form part of this invention. There are many other suitable stabilizers which may be used in lieu of those mentioned above.

In developing this invention, several significant comparison tests were carried out. In one, prior art organic brake material was rubbed rapidly back and forth under 30 pounds of normal load against prior art AISI–SAE 1035 steel until the temperature of both the brake material and the steel rose from room temperature to a temperature in excess of 1000° F. In another test, alumina was rubbed against AISI–SAE 1035 steel under the above-described conditions. In another test, zirconia was rubbed against AISI–SAE 1035 steel under the above-described conditions. In still another test alumina and hardened BG42 steel were paired under the above conditions. Finally stabilized zirconia and hardened BG42 were tested as a friction pair. In all cases the coefficient of friction ($f$) was measured over the critical 400° F. to 1000° F. temperature range. The results of the tests, except the one in which prior art organic brake material was used with prior art steel, are summarized in the following table. The test involving prior art organic brake material and AISI–SAE 1035 steel is not included in the table because the organic brake material disintegrated at slightly less than 1000° F. under the test conditions.

TABLE.—COEFFICIENT OF FRICTION ($f$) AT TEMPERATURES BETWEEN 400° F. AND 1,000° F.

| Materials | 400° | 600° | 800° | 1,000° |
|---|---|---|---|---|
| $Al_2O_3$ vs. 1035 steel | .70 | .62 | .59 | .55 |
| $ZrO_2$ vs. 1035 steel | .70 | .68 | .73 | .57 |
| $Al_2O_3$ vs. hardened BG42 | .59 | .55 | .51 | .51 |
| $ZrO_2$ vs. hardened BG42 | .65 | .59 | .58 | .55 |

It may be seen from the table that when alumina and zirconia are used with hardened BG42 steel at temperatures between 400° F. and 1000° F., the fluctuation in $f$ is 0.1 or less. On the other hand, $f$ varies from a high of .70 to a low of .55 or .15 in value when alumina is paired with AISI–SAE 1035 steel and from a high of .73 to a low of .57 or .16 in valui when zirconia and AISI–SAE 1035 steel are paired.

At temperatures where brake friction materials spend the majority of time while the brakes are being operated (400° F. to 1000° F.), the fluctuation of $f$ with temperature is less than or equal to 0.1 with the alumina-hardened BG42 and zirconia-hardened BG42 pairs whereas it is greater than 0.1 in the two cases where alumina and zirconia are paired with AISI–SAE 1035 steel.

As stated above, the most constant coefficient of friction would be to no avail if either of the materials of a friction pair showed a great tendency to wear. Alumina and zirconia pieces used in the tests were weighed prior to and after completion of the tests and examined for wear scars. Neither alumina nor zirconia exhibited any significant signs of weight loss or any significant wear scars. On the other hand, both steels exhibited wear scars upon completion of the tests. When alumina and AISI–SAE 1035 steel were paired, the steel exhibited wear scars having depths of up to 1,100 microinches. When zirconia and AISI–SAE 1035 steel were paired, wear scars having depths of up to 1,000 microinches resulted. On the other hand, when alumina and zirconia were paired with hardened BG42 steel, the wear scar depths averaged 150 and 500 microinches respectively. Thus, hardened BG42 exhibited much greater wearability than the prior art steel.

To test the feasibility of hardened and nitrided BG42 steel as a rotor disc material, it was paired with alumina under the above test conditions. In this test, $f$ varied, in the critical 400° F. to 1000° F. range, from a high of .55 at 400° F. to a low of .51 at 1000° F. Thus, $f$ varies even less when hardened and nitrided BG42 is used with alumina than when hardened BG42 is used with alumina. The wear scar depths averaged 150 microinches when alumina was paired with hardened and nitrided BG42.

All of the above-described tests were carried out at 30 oscillations per minute because friction varies with speed. Also, smoothly polished materials of similar size and geometric design were used in all cases.

We claim:
1. A friction pair comprising
   (a) a first surface of hardened alloyed steel containing from 1.1 to 1.2 weight percent carbon, 14.0 to 15.0 weight percent chromium, 1.1 to 1.3 weight percent vanadium, 3.75 to 4.25 weight percent molybdenum, 0.2 to 0.4 weight percent silicon, a maximum of .015 weight percent sulfur, a maximum of .025 weight percent phosphorous, a maximum of 0.40 weight percent nickel, and a balance of iron, said steel having a hardness of at least 64 Rockwell C; and
   (b) a second surface consisting of a material selected from the group consisting of alumina and stabilized zirconia.

2. A friction pair according to claim 1 wherein said first surface is nitrided and has a surface hardness of from about 73 to about 75 Rockwell C.

3. A friction pair according to claim 1 wherein said second surface is alumina.

4. A friction pair according to claim 1 wherein said second surface is stabilized zirconia.

References Cited

UNITED STATES PATENTS

| | | | |
|---|---|---|---|
| 3,003,588 | 10/1961 | Huntress | 188—251 M X |
| 3,141,801 | 7/1964 | Prutton | 148—16.6 X |
| 3,434,998 | 3/1969 | Aldrich | 188—251 M UX |
| 3,269,489 | 8/1966 | Roth | 188—251 M |

OTHER REFERENCES

"Metal Selector," 1963 edition, The Penton Publishing Company, Penton Bldg., Cleveland, Ohio 44113, pp. 5–13.

EVON C. BLUNK, Primary Examiner

W. S. CARSON, Assistant Examiner